United States Patent [19]
Engst

[11] Patent Number: 4,732,264
[45] Date of Patent: Mar. 22, 1988

[54] BELT CONVEYER SYSTEM

[75] Inventor: Wilhelm Engst, Garbsen, Fed. Rep. of Germany

[73] Assignee: Continental Gummi-Werke Aktiengesellschaft, Hanover, Fed. Rep. of Germany

[21] Appl. No.: 927,652

[22] Filed: Nov. 5, 1986

[30] Foreign Application Priority Data

Nov. 13, 1985 [DE] Fed. Rep. of Germany ....... 3540160

[51] Int. Cl.⁴ .............................................. B65G 15/14
[52] U.S. Cl. ..................... 198/605; 198/626
[58] Field of Search ............... 198/604, 605, 607, 626, 198/628, 819, 640, 641

[56] References Cited

U.S. PATENT DOCUMENTS

| | | | |
|---|---|---|---|
| 2,978,095 | 4/1961 | Jenike | 198/605 |
| 3,429,422 | 2/1969 | Yoshimura | 198/819 |
| 3,618,746 | 11/1971 | Suloff | 198/628 |
| 4,580,677 | 4/1986 | Paelke | 198/605 |

FOREIGN PATENT DOCUMENTS

| | | | |
|---|---|---|---|
| 578227 | 10/1977 | U.S.S.R. | 198/628 |
| 874506 | 10/1981 | U.S.S.R. | 198/819 |

Primary Examiner—Joseph E. Valenza
Attorney, Agent, or Firm—Becker & Becker, Inc.

[57] ABSTRACT

A belt conveyer system where along various sections great differences in height must be overcome. A conveyer belt that is initially spread flat is guided in steeply inclined stretches to form a closed hose. To satisfactorily transport, without loss, even difficult-to-handle, fine-particled material, the transition from a steep section into a horizontal section, or even to a discharge station, the steadily opening cross-sectional area is a critical process. To avoid the danger of disruption, a cover belt is provided that extends over the transition zone. The lower run of this cover belt extends into the opening hose cross-section of the conveyer belt, rests directly upon the transported material, and is supported on both sides on the edges of the conveyer belt.

3 Claims, 6 Drawing Figures

BELT CONVEYER SYSTEM

BACKGROUND OF THE INVENTION

1. Field of the Invention

The present invention relates to a belt conveyer system in which material is transported by an endless conveyor belt that can be closed off to form a hose, and that can be made of rubber or rubber-like synthetic material.

2. Description of the Prior Art

By embodying the conveyor belt as a so-called hose belt that can be closed off to form a complete circular cross-section by overlapping the longitudinal edges of the belt, it is possible, at high conveying capacities, to overcome steeper inclines than was possible with the previously customary flat or trough conveyer belts. However, in the heretofore known conveyer systems equpped with such a hose belt, problems were encountered in those sections where the belt opened from its circular, closed, cross-sectional shape into the flat, spread-out shape. These problems were due to the fact that in these sections the material that was being transported was unprotected and could thus be subjected to wind and rain. Such open sections of the conveyer system occur on the one hand where the belt changes over from a steeply ascending stretch into a flat or descending stretch, and on the other hand occur at the end of a transporting stretch where the belt is guided in a flat state about an end guide roller and the material that is being transported is discharged.

It is therefore an object of the present invention also in these two regions to provide a possibility for obtaining and utilizing the advantages of the closed, hose belt conveying, i.e. the complete enclosure of the material that is being transported, to the greatest extent possible.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
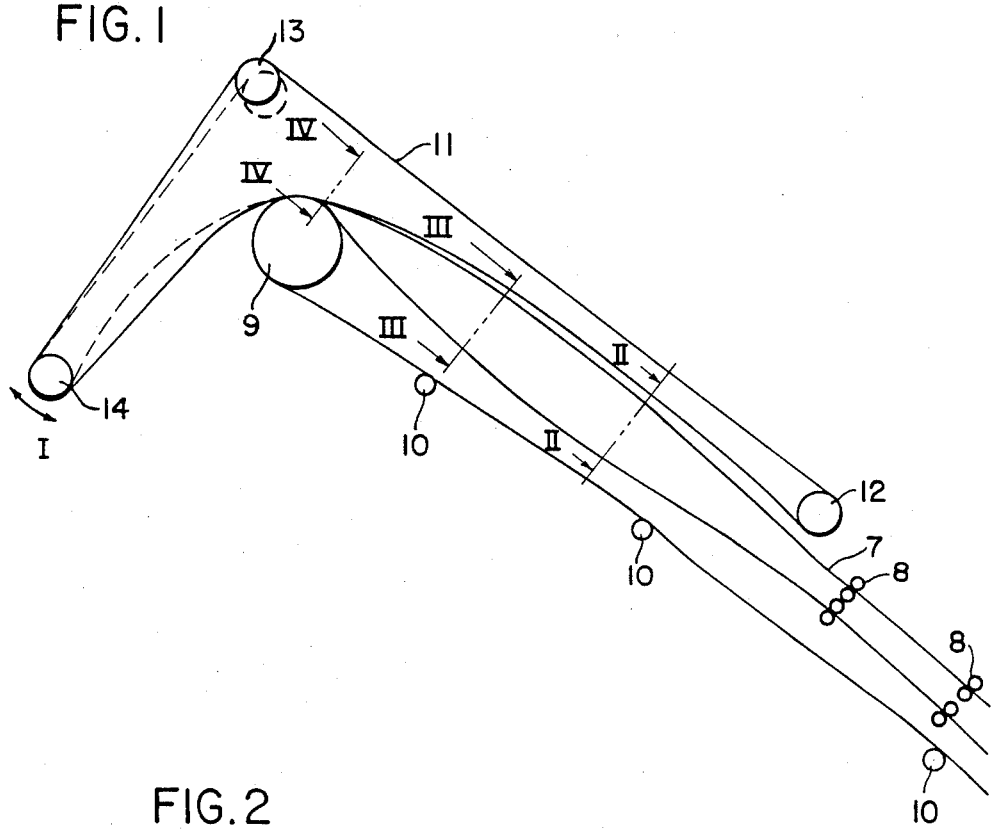
FIG. 1 is a side view of the discharge region of one inventive embodiment of a conveyer system having a cover belt.

The belt conveyer system of the present invention is characterized primarily in that, in the transition region of the conveyor belt from the hose shape to the spread-open shape, the lower run of an endless cover belt, that runs over at least three guide rollers, extends into the opening cross-sectional area of the conveyor belt, with a central portion of the lower run of this cover belt resting directly upon the material that is being transported, and with the edge portions of the cover belt resting on the longitudinal edges of the conveyor belt.

Expediently disposed on both sides of the conveyor belt, to support those edge regions of the lower run of the cover belt that project laterally beyond the conveyer belt, are sets of support rollers that are oriented at an angle of incline relative to the horizontal. It is furthermore advantageous in the central portion of the lower run of the cover belt, to provide one or more freely rotatable pressure rollers that are radially adjustable in the direction toward the covered material that is being transported.

According to the inventive association of the cover belt with the conveyor belt, an enclosed transport of material is assured even where the hose belt gradually opens and where it is completely open in a flattened or trough-like state. The endpoints of the cover belt guidance are determined by respective guide rollers. Disposed between these endpoints are one or more other guide rollers that keep the upper run at a sufficient distance from the lower run. This results in the characteristic arrangement pattern of an angle that is open toward the covered conveyor belt, with the lower run of the cover belt additionally being supported against that guide roller that guides the conveyor belt, in its flattened end state, into the horizontal stretch. The close association of the cover belt with the conveyor belt results in the cover belt, in a convexly curved manner, being pulled into the hose belt cross-section already in the starting phase of the opening process, and results in the cover belt resting tightly upon the loose material that is being transported. This effect is particularly enhanced if, pursuant to a preferred embodiment of the invention, the cover belt contains load-carrying cords that are embedded exclusively in the edge regions and that extend in the longitudinal direction. Pressure rollers that rotate on the lower run of the cover belt assure direct contact with the transported material independent of all shifting thereof caused by the progressive cross-sectional changes of the conveyor belt. The cover belt is supported on both sides on the bent-up belt edges that gradually diverge from one another. Thus, the transported material is reliably covered by the cover belt in every phase of the belt movement until, after passing the end guide roller, it is discharged or, where merely a change in incline of the conveying stretch is involved, the material is again conveyed into a hose-like closed stretch.

For the design of the discharge location, the present invention offers and provides the advantage of a precise and protected guidance of the mass flow if the cover belt, in contact with the flat-planar conveyor belt, is guided through a limited curve angle about the end guide roller of the conveyor belt, and below this, is guided about a lower guide roller that is placed ahead in the direction of discharge. In this way, the dropping material can be held tightly together in a dense stream, the direction of which can be determined. Since the lower run of the cover belt moves at practically the same downward speed as do the impacting particles of transported material, the cover belt is subjected to very little wear. To be able to finally adjust the conditions to the characteristics of different transported material having respectively different discharge parabolas, a preferred embodiment of the present invention proposes that the lower guide roller of the cover belt be mounted in such a way that it is adjustable in the radial direction in a plane that is parallel, or at least essentially parallel, to the discharge direction.

The width of the cover belt is expediently of the order of magnitude of the width of the conveyer belt in its flat-planar state. For very great transport capacities, it is advantageous to provide the cover belt, on that surface which faces the conveyer belt, with continuous, resilient wall or side elements that are placed on the edges of the cover belt. So that it is possible to take along larger quantities of material, these wall elements enclose along with the conveyer belt, which in the end phase of the opening process is bordered on both sides by these elements, a space that is considerably greater than that created when the cover belt rests in a flat state on the material transported by the conveyer belt. It is furthermore recommended in this situation that the load-carrying cords that extend in the longitudinal direction be embedded exclusively in these wall elements.

Further features of the present invention will be discussed in detail subsequently.

DESCRIPTION OF PREFERRED EMBODIMENTS

Referring now to the drawings in detail, the portion of the conveyer system illustrated in FIG. 1 contains a conveyer belt 7 of synthetic rubber; load-carrying cords that extend in the longitudinal direction are preferably embedded only in the edge regions of the conveyer belt 7. In steeply inclined stretches, the conveyer belt 7, by means of sets 8 of idler or support rollers that are grouped together in a garland fashion, is movably supported and formed into a hose belt having an approximately circular cross-sectional shape with edges that overlap one another. On the other hand, to discharge or dump the material that is being conveyed, the conveyer belt 7 is opened by the end guide roller 9 in a continuous process by an appropriate grouping of the support rollers. Finally, the conveyer belt 7 is spread to its full linear width as it runs up on the guide roller 9. The returning empty run can be guided on customary single cylindrical support rollers 10.

Disposed above the conveyer belt 7 is a cover belt 11 that extends over the transition region of the conveyer belt from its completely closed state to its completely opened state. In the illustrated embodiment, the cover belt 11 is endlessly guided over three guide rollers 12, 13, 14, and is associated with the conveyer belt 7 in the shape of an angle that is open toward the latter. The rearward guide roller 12, as viewed in the direction of conveyance, preferably serves as the drive roller and is stationarily freely rotatably mounted directly or only slightly ahead of the transition region of the conveyer belt 7, which region is defined by the start of the first opening movement. In contrast, the forward guide roller 14 is disposed at a great distance ahead of, and at an angle below, the end guide roller 9 of the conveyer belt 7. The upper or central guide roller 13, about which the upper run of the cover belt 11 is looped, is mounted in such a way as to be slightly radially adjustable in order to be able to regulate or alter the tension of the cover belt when necessary. Thus, for example, shifting of the guide roller 13 into the position indicated by dashed lines in FIG. 1 leads to a slackening along with a change of the discharge tangent as shown by the dashed line in the dumping position. The guide roller 14 can be adjusted in a wide range as indicated by the double arrow I. The necessity or advantage of such alterations in the geometry of the cover belt guidance results, for example, from a change of the material that is being conveyed, which routinely also involves changes in the falling and impact conditions.

Figure 2:
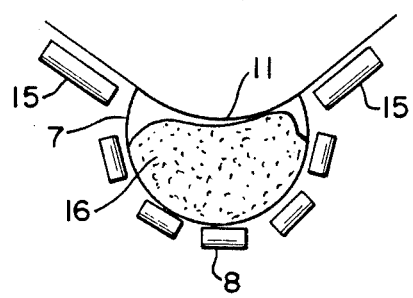
FIG. 2 is a cross-sectional view taken along the line II—II in FIG. 1.
Figure 3:
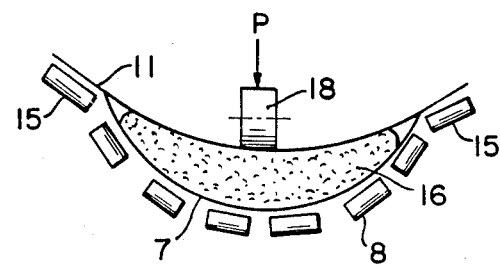
FIG. 3 is a cross-sectional view taken along the line III—III in FIG. 1.
Figure 4:
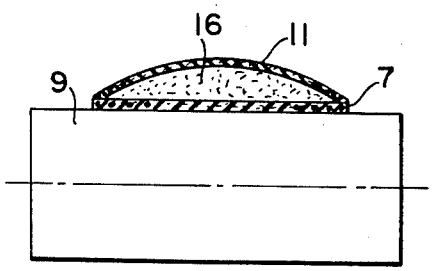
FIG. 4 is a cross-sectional view taken along the line IV—IV in FIG. 1.

FIG. 2 illustrates the conveyer belt 7 in the first third of the transition zone in a partially opened state. Under the effect of gravity, and as a result of the exclusive placement in the edge regions of the load-carrying cords that absorb tension forces, the lower run of the cover belt 11 is drawn convexly, in an appropriately V-shape, into the increasingly opening gap of the originally circular cross-section. In so doing, the lower run of the cover belt 11 rests with slight pressure upon the material 16 that is being transported. This lower run is linearly supported on the still bent-up side edges of the conveyer belt 7. However, those side regions of the lower run that extend beyond these bent-up side edges of the conveyer belt 7 are additionally guided on inclined cylindrical support rollers 15. The cross-sectional view of FIG. 3 shows an opening state or condition that has already progressed further, with a freely rotating pressure roller 18, to which is applied a variable force P, pressing the central portion of the lower run of the cover belt 11 down onto the material 16 that is being transported in a more intense manner. In the end state (prior to the material 16 being dumped) or final condition as illustrated in FIG. 4, the conveyer belt 7 runs in a fully spread state or condition onto the guide roller 9 and, as this guide roller rotates further, discharges the compactly held material 16 in a constantly uniform direction at a precisely defined adjustment of the roller. Since the mass flow in free fall no longer describes a parabola of changing chord length, but rather a movable guidance is provided for that leg of the cover belt 11 that continues downwardly at an angle, the impact zone can be precisely localized in a narrowly defined manner.

Figure 5:
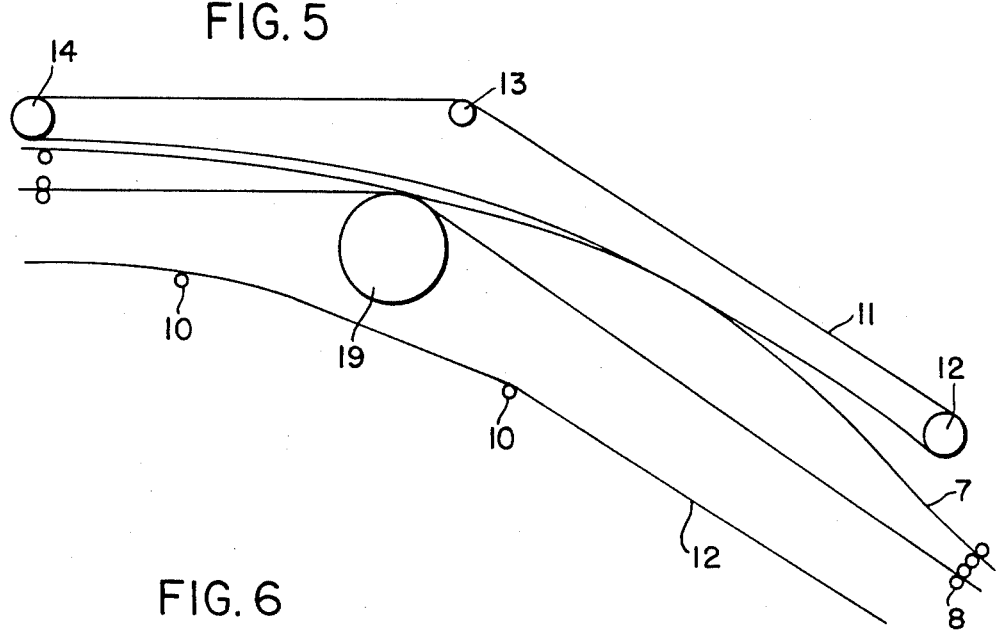
FIG. 5 is a side view of the transition area from a steeply inclined stretch to a horizontal stretch of an inventive conveyer system.

In FIG. 5, the transition of the conveyer belt 7 from a steeply inclined stretch into a continuing horizontal stretch is illustrated using a cover belt 11 in the inventive arrangement. In this case, the guide or deflection roller 19 does not mark the end of the conveying stretch, but rather marks only a change in direction that is connected with a change in shape of the conveyer belt 7, which is initially closed to form a hose cross-section. The operation is essentially the same as that described in conjunction with FIGS. 1 to 4.

Figure 6:
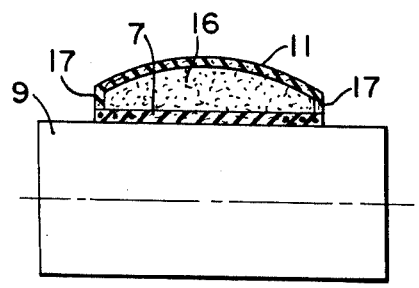
FIG. 6 is a cross-sectional view, similar to the illustration of FIG. 4, through an inventive conveyer system having a differently embodied cover belt.

In the embodiment illustrated in FIG. 6, the cover belt 11 is provided with flexible wall or side elements 17 that are placed on the side edges, so that when the conveyer belt is spread to its full width, the cover belt 11 can trap a greater volume of material than is possible when the cover belt rests upon the material in a flat state or condition. In other respects, the operation of this embodiment is essentially the same as that previously described.

The present invention is, of course, in no way restricted to the specific disclosure of the specification and drawings, but also encompasses any modifications within the scope of the appended claims.

What I claim is:

1. A belt conveyer system that includes an endless conveyer belt which is intended for transporting material and which, over a majority of its transporting stretch, can be closed off by overlapping its longitudinal edges to form a hose belt that is supported all the way around by first rollers, with said conveyer belt having zones where it is spread open, these zones being guided over second guide rollers; said system further comprising:

an endless cover belt that has an upper run and a lower run, and that runs over at least three third guide rollers; in the transition region of said conveyer belt from the hose shape to the spread-open shape, said lower run of said cover belt extends into the opening cross-sectional area of said conveyer belt, with a central portion of said lower run of said cover belt resting directly on transported material, and with edge portions of said lower run of said cover belt resting on longitudinal edges of said conveyer belt;

said cover belt in a discharge location of said conveyer belt, with said cover belt being in contact with a flat, spread-open state of said conveyer belt, where said cover belt is guided, through a limited curve angle, about an end one of said second guide rollers, with said cover belt then being guided about a lower one of said third guide rollers that is disposed below said end second guide roller and ahead of the latter as viewed in the direction of discharge of material from said conveyer belt at least in said transition region, said edge portions of said lower run of said cover belt project laterally beyond said conveyor belt on both sides and are supported by fourth support rollers that are oriented at an angle relative to a horizontal plane so that said cover belt forms a convex shape projecting into said opening cross-sectional area of said conveyor belt.

2. A belt conveyer system according to claim 1, which includes at least one pressure roller that is freely rotatably disposed between said upper end lower runs of said cover belt and is adjustable at right angles to the direction of transport of said conveyer belt; said pressure roller rests against said lower run, on that side thereof remote from said transported material, and presses said central portion of said lower run against said material;

said edge portions of said cover belt being provided with continuous embedded load-carrying cords that extend in the longitudinal direction;

the width of said conveyer belt corresponding to the width of said conveyer belt in the flat, spread-open state of the latter.

3. A belt conveyer system according to claim 1, in which said lower third guide roller of said cover belt is mounted in such a way as to be movable in a radial direction in a plane that extends at least essentially parallel to the direction of discharge of material from said conveyer belt.

* * * * *